United States Patent [19]

Dierker, Jr.

[11] Patent Number: 4,893,075

[45] Date of Patent: Jan. 9, 1990

[54] DUAL SPEED SENSOR PICKUP ASSEMBLY WITH ANTI-CROSS TALK COILS

[75] Inventor: Joseph B. Dierker, Jr., Southfield, Mich.

[73] Assignee: Eaton Corporation, Cleveland, Ohio

[21] Appl. No.: 260,963

[22] Filed: Oct. 21, 1988

Related U.S. Application Data

[63] Continuation-in-part of Ser. No. 237,920, Aug. 29, 1988, abandoned.

[51] Int. Cl.[4] .......................... G01B 7/14; G01P 3/48; G01P 3/54
[52] U.S. Cl. .................................... 324/174; 324/208; 324/225
[58] Field of Search ............... 324/173, 174, 207, 208, 324/225; 340/870.31; 310/155, 168, 171; 123/414; 307/308, 515, 514; 328/5

[56] References Cited

U.S. PATENT DOCUMENTS

3,691,214  6/1976  Lokkart ............................... 310/168

Primary Examiner—Reinhard J. Eisenzopf
Assistant Examiner—Walter E. Snow
Attorney, Agent, or Firm—P. S. Rulon

[57] ABSTRACT

A dual speed sensor pickup assembly (140) for sensing the rotational velocity of two independently rotatable, closely axially spaced exciter rotors (116 and 118) is provided. The pickup assembly includes two speed sensor assemblies (136 and 138) each including a pole piece (152,160) having a longitudianl axis (152a,160a) with the longitudinal axes skewed relative to one another but radial relative to the common axes of rotation (24) of the exciter rotors. Each speed sensor includes a permanent magnet (154,162) disposed between an end of the pole piece (152,160) and having a face divided into first and second surface (154a,154b and 162a,162b) by a slot (154c,162c) therein. In one embodiment a primary coil (156,164) and a secondary or anti-cross talk coil (158,166) surrounds the pole piece of each sensor (136,138), and each secondary coil is conductively connected to the primary coil of the other sensor. In another embodiment, an electronic circuit (176) is provided for producing anti-cross talk signals which are added to the speed sensor signals.

11 Claims, 6 Drawing Sheets

DUAL SPEED SENSOR PICKUP ASSEMBLY WITH ANTI-CROSS TALK COILS

RELATED APPLICATIONS

This application is a continuation-in-part of U.S. patent application Ser. No. 237,920, filed Aug. 29, 1988, now abandoned.

This application is also related to U.S. patent application Ser. No. 236,569, filed Aug. 25, 1988 now U.S. Pat. No. 4,862,028, U.S. patent application Ser. No. 236,570, filed Aug. 25, 1988 now U.S. Pat. No. 4,862,025, and U.S. patent application Ser. No. 237,914, filed Aug. 29, 1988 now abandoned. These applications are assigned to the assignee of this application.

FIELD OF THE INVENTION

The present invention relates to a speed sensor. In particular, the present invention relates to a speed sensor assembly mounted to the differential head portion of a drive axle housing for sensing the rotational speed of the driven ring gear and one of the differential side gears. More particularly, the present invention relates to a dual speed sensor pickup assembly.

DESCRIPTION OF THE PRIOR ART

ABS or anti-lock brake systems are well known in the prior art as may be seen by reference to U.S. Pat. Nos. 3,604,760; 3,719,841; 3,767,270; 3,854,556; 3,995,912; 3,929,382 and 3,929,383, the disclosures of all of which are hereby incorporated by reference. Briefly, these systems utilize speed sensors, usually a separate sensor assembly at each of the axle ends of each monitored vehicle axle, to sense individual or average rotational wheel speed and to provide signals indicative thereof. Logic means are utilized to receive and process the signals in accordance with predetermined logic rules to determine if an impending or actual wheel-lock condition exists and to issue command output signals to modify the braking force applied to monitored and/or controlled brake sites.

Simplifying such systems by utilizing a single sensor mounted in a relatively protected location within the drive axle housing for sensing the rotational speed of the differential gearing which will provide an average wheel speed signal, is also known in the prior art as may be seen by reference to U.S. Pat. Nos. 3,719,841 and 4,724,935, the disclosures of which are incorporated by reference.

The use of an in-axle wheel speed sensor assembly mounted in the drive axle housing adjacent the differential gearing for sensing an average wheel speed value and an individual wheel speed value (from which both wheel speed values may be calculated) is known in the prior art as may be seen by reference to U.S. Pat. No. 3,769,533, the disclosure of which is incorporated by reference.

While the prior art in-axle speed sensor assemblies are improvements over sensor assemblies mounted at the wheel ends as the sensors and exciters are located at a more protected location and the signals are required to travel a shorter distance and thus be less subject to damage and/or electromagnetic interference, such assemblies were not totally satisfactory as only an average wheel speed was sensed, mounting of the exciter rotors to the gearing required considerable time and/or modification of the existing gearing and/or cross talk interference between two closely spaced sensor pickups was not minimized.

Further, slotting and matching the shape of a speed sensor pole piece end adjacent moving exciter surfaces or teeth of an exciter rotor to improve output characteristics of a variable reluctance speed sensor is known as may be seen by reference to Paper 741084 presented at the International Automotive Engineering and Manufacturing Meeting in Toronto, Canada, October, 1974. While such a prior art sensor is considered to have improved output characteristics, it is not totally satisfactory since relatively small variations in the gap between pole piece end and the moving teeth of the exciter rotor cause large variations in the output signal.

Filtering techniques for removing cross talk between closely spaced speed sensors are known. However, such techniques can be ineffective when the cross talk is in the frequency range of the desired true speed signal.

SUMMARY OF THE INVENTION

An object of the present invention is to provide a dual speed pickup assembly having closely spaced electromagnetic speed sensors producing speed signals that are substantially free of cross talk.

According to a feature of the invention, a dual speed sensor pickup assembly senses the rotational speed of two exciter rotors that are closely and axially spaced and independently rotatable about a common axis of rotation. The pickup assembly comprises mounting means for mounting the pickup assembly in a predetermined position relative to the exciter rotors and first and second closely spaced speed sensor assemblies fixedly retained in the mounting means. Each speed sensor assembly comprises a ferromagnetic pole piece, a permanent magnet, and a conductive coil surrounding the pole piece. The pole pieces each define a longitudinally extending axis about which the coil is looped. The coils each have a composite signal induced therein composed of a true speed signal of the associated exciter rotor and a cross talk signal from the other speed sensor. The pickup assembly is characterized by each speed sensor including anti-cross talk means associated therewith for producing anti-cross talk signal added to the composite signal in the coil of the other speed sensor for canceling the cross talk signal therein.

DESCRIPTION OF THE PREFERRED EMBODIMENT

In the following description of the present invention, certain terms will be utilized for purposes of reference only and are not intended to be limiting. The terms "upward", "downward", "rightward" and "leftward" refer to directions in the drawings to which reference is made. The words "inward" and "outward", respectively, refer to directions towards and away from, respectively, the geometric center of the device described. Said terminology will include the words above specifically mentioned, derivatives thereof and words of similar import.

Figure 1:
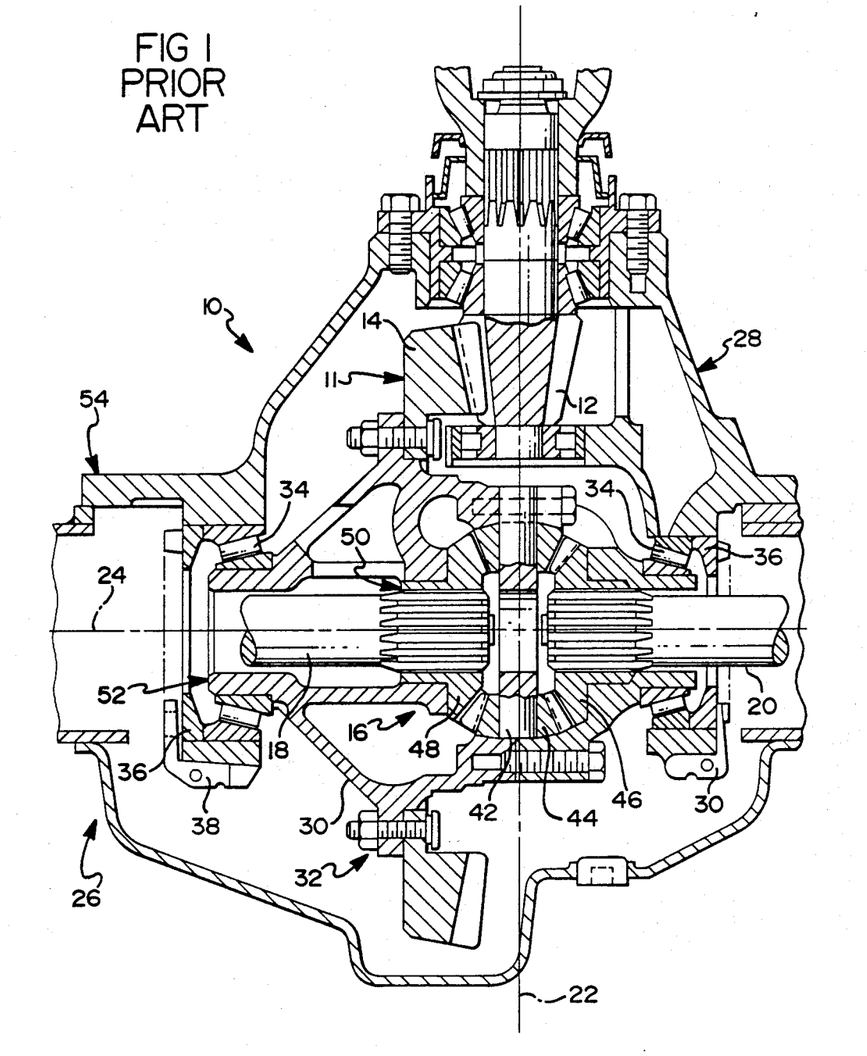
FIG. 1 is a partial sectional view of a typical prior art heavy-duty drive axle of the type to which the exciter rotor assembly of the present invention is utilized.

Heavy-duty drive axles utilizing ring gear/pinion gear right angle gear-sets are well known in the prior art. Referring to FIG. 1, a single reduction drive axle 10 utilizing such a gear-set 11 comprising a pinion gear 12 meshingly engaged with a ring gear 14 is illustrated. A differential assembly 16 is fixed to the ring gear for driving the two axle shafts 18 and 20. Axle shafts 18 and 20 drive the left and righthand, respectively, drive wheels (not shown) as is well known in the prior art. The axis of rotation 22 of the pinion gear 12 is substantially perpendicular to the axis of rotation 24 of ring gear 14 (and the differential 16 and axle shaft 18 and 20). Heavy-duty drive axles of this, and of the two-speed planetary double reduction type, are well known in the prior art.

The drive axle assembly includes an axle housing 26 having a differential head portion 28. The ring gear 14 is mounted for rotation with a differential carrier 30 by means of bolt and nut assemblies 32. The differential carrier is rotationally supported in the housing portion 28 by means of taper bearings 34 which are adjustably positioned by bearing adjusters 36 which are maintained in position by bearing adjuster lock members 38, and unshown bolts.

The differential carrier 30 carries the differential spider member 42 on which are rotatably received the differential pinion gears 44. The differential pinion gears are constantly meshed with a righthand and lefthand side gear, 46 and 48, respectively, which side gears are rotatably engaged by the drive shafts 20 and 18 by means of a splined connection as is well known in the prior art. As is also well known in the prior art, the rotational speed of ring gear 14, and differential carrier 30 which rotates therewith, is equal to the average speed of the side gears 46 and 48. Accordingly, if the rotational speed of any two of ring gear 14, side gear 46 and side gear 48 is known, the rotational speed of the other of the gears may be easily determined. Further details may be seen by reference to above-mentioned U.S. Pat. No. 3,769,533.

To utilize an exciter rotor assembly with a standard drive axle of the type illustrated in FIG. 1, only the leftwardly facing axial surface 50 of side gear 48, a leftwardly facing axial surface 52 of the carrier 30 and possible surface 54 of the housing portion 28 require modification as will be described in detail below.

Figure 2:
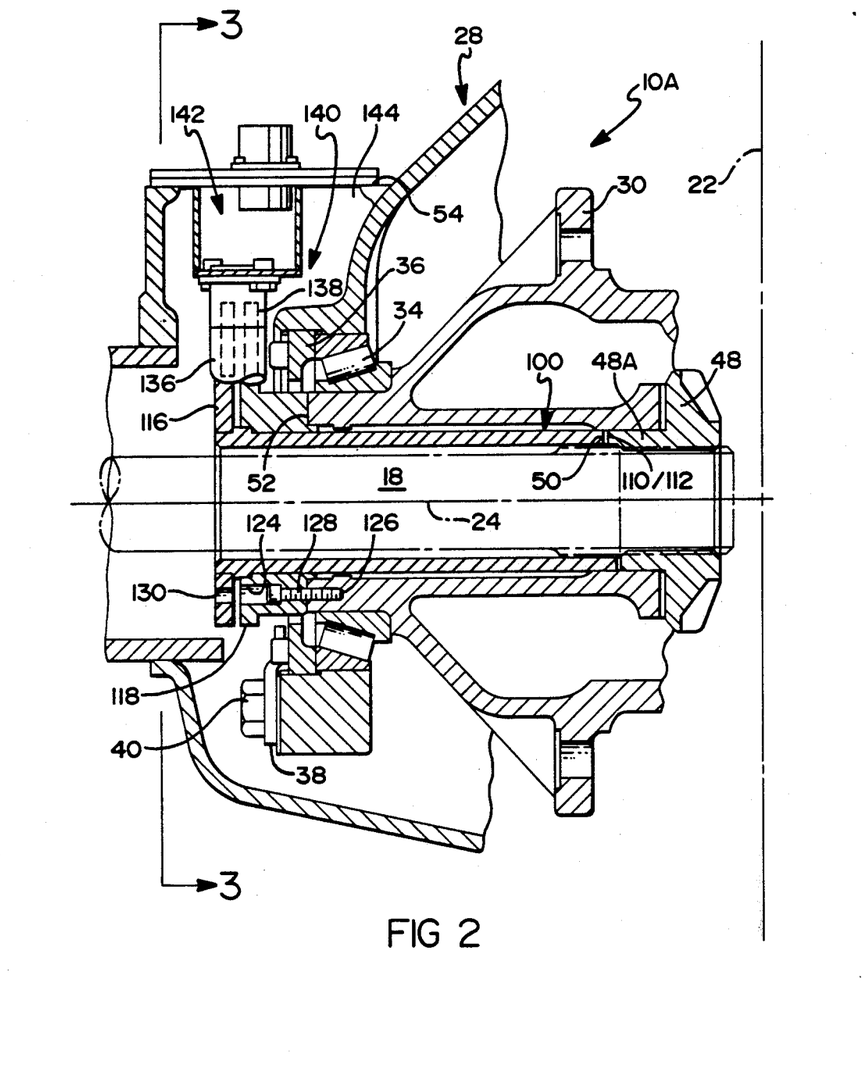
FIG. 2 is a partial sectional view of a drive axle assembly similar to FIG. 1 in which the exciter rotor assembly and the dual speed sensor pickup assembly of the present invention have been mounted.
Figures 3, 4:
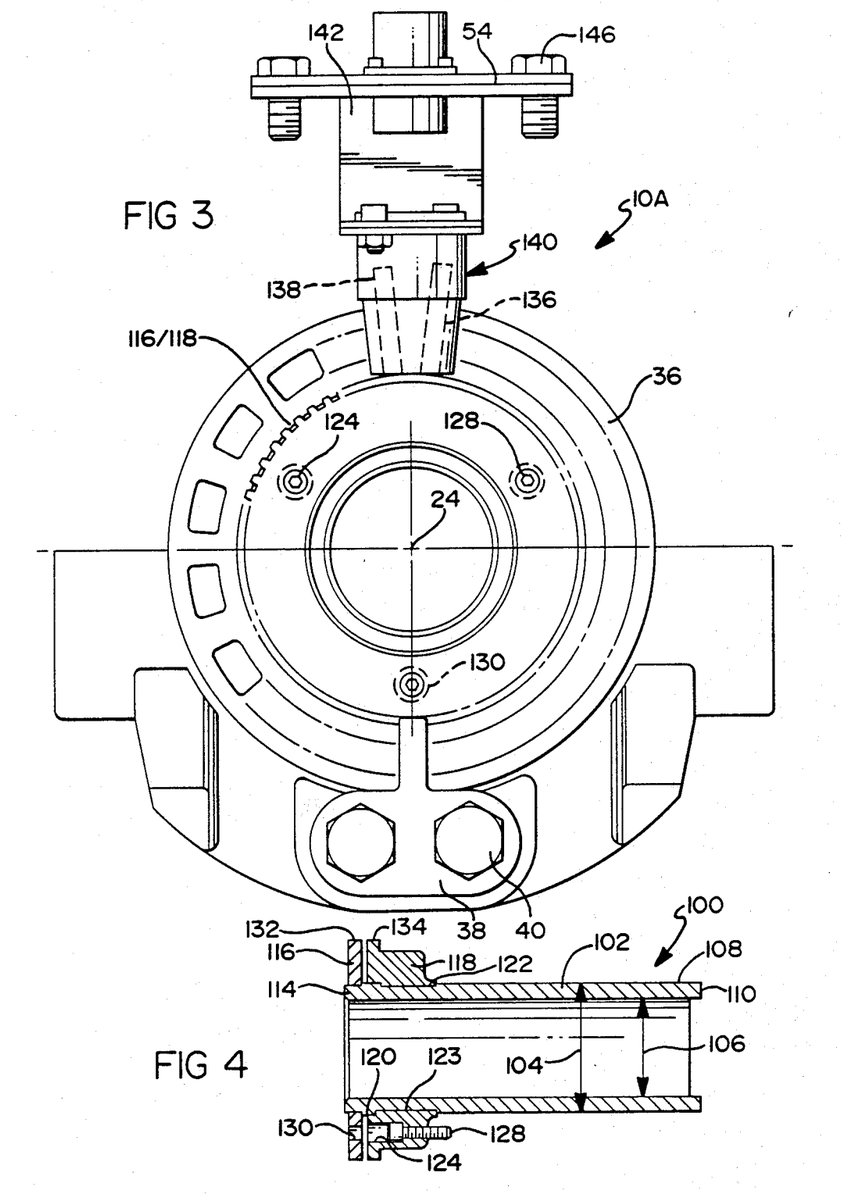
FIG. 3 is a partial sectional view taken along the lines 3—3 in FIG. 2.
FIG. 4 is an enlarged elevational view of the exciter rotor assembly.
Figure 5A:
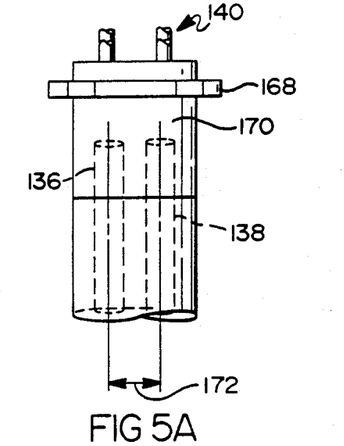
FIGS. 5A and 5B, are front and side relief views of the dual speed sensor pickup assembly of the present invention.
Figure 5B:
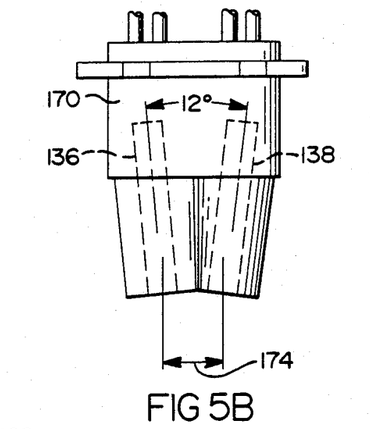

The exciter rotor assembly 100 may be seen by reference to FIG. 4 and as installed in a drive axle 10a, substantially identical to drive axle 10 described in FIG. 1 above, and by reference to FIGS. 2 and 3.

Exciter rotor assembly 100 includes a generally tubular member 102 having an outer diameter 104 generally equal to the outer diameter of the hubbed portion 48a of side gear 48 and an inner diameter 106 slightly greater than the outer diameter of axial shaft 18 allowing the axle shaft 18 to be received within the tubular portion 102. At its rightward or inboard end 108 the tubular portion is provided with a pair of axially inwardly extending projections or teeth 110 which are engagable with axially extending slots 112 opening to the surface 50 of the hub portion 48a of side gear 48. Engagement of the projection teeth 110 in the slots 112 will, of course, rotationally couple the tube 102 to the side gear 48. At its leftward or outboard end 114, the tubular portion carries an exciter rotor 116 fixed thereto as by welding or the like. Exciter rotor 116 will, accordingly, rotate with side gear 48, axle shaft 18 and the wheel end driven thereby where the teeth 110 and slots 112 are interengaged.

Another exciter rotor 118 is rotatably carried by tubular member 102 immediately axially adjacent exciter rotor 116. Preferably, exciter rotor 118 is axially positioned on the tubular member 102 between a shoulder portion 120 separating the two exciter rotors and a snap-ring 122. An anti-friction bushing or bearing 123 may be utilized to support rotor 118 on tubular member 102. Exciter rotor 118 is provided with a plurality of through bores 124 generally equally circumferentially spaced about the rotor. The leftwardly axially facing surface 52 of carrier 30 is provided with a complimentary set of tapped blind bores 126 for threaded receipt of bolts or cap screws 128 by which the exciter rotor 118 is rotationally fixed to the differential carrier 30 and the assembly 100 is axially retained within the drive axle 10a. The rotor 116 is provided with one or more through bores 130 on a bolt circle having the same diameter as bores 124 and 126 allowing access to the bolts or cap screws 128 by a screwdriver, allen wrench, or the like. Accordingly, by modifying axle 10a, relative to standard axle 10, only by providing slots 112 in surface 50 of the side gear hub 48a and internally threaded bores 126 in surface 52 of the differential carrier 30, the exciter rotor assembly 100 may be easily assembled to the drive axle by means of three cap screws or bolts 128 which are threadably received in or removed from the threaded bores 126 from the exterior of the drive axle through the access bores 130 provided in rotor 116.

Exciter rotors 116 and 118, respectively, are provided with teeth 132 and 134 defining radially facing exciter surfaces 132a,134a(FIG. 6), respectively, which will rotate past the axially spaced electromagnetic speed sensors 136 and 138, respectively, which are contained in the dual speed sensor pickup assembly 140. Preferably to minimize electromagnetic interference, the central processing unit, or CPU 142, for processing the input signals from pickups 136 or 138, is integral with or attached directly to the pickup assembly 140. The speed sensor pickup assembly 140 and CPU 142 are mounted at an opening 144 provided in surface 54 of the housing 26. Preferably, opening 144 may be the opening commonly utilized with two speed axle actuators and/or differential lockup actuators of the types illustrated in U.S. Pat. Nos. 3,503,280; 3,502 177 and 3,358,517, the disclosures of all of which are hereby incorporated by reference. Alternatively, opening 144 may be provided in surface 54 as well as two threaded blind bores for receipt of mounting bolts 146.

The operation, structure and function of electromagnetic speed sensor assemblies comprising an exciter rotor and a pickup or stator member is well known in the prior art as may be seen by reference to U.S. Pat. Nos. 3,854,556; 3,938,112; 3,961,215; 3,988,624 and 3,961,214, the disclosures of all of which are hereby incorporated by reference. Briefly, in a typical electromagnetic speed sensor assembly, rotation of the exciter rotor past the pickup member will induce an electromagnetic potential having pulses or a frequency proportional to the relative rotational speed of the rotor.

Dual speed sensor assembly 140, which is best seen in FIGS. 5–8, includes the speed sensor 136 for sensing the rotational speed of ring gear 14 fixed to differential carrier 30 and the speed sensor 138 for sensing the rotational speed of drive shaft 18 fixed to side gear 48. Speed sensor 136 includes an elongated ferromagnetic pole piece 152 having a longitudinal axis 152$a$ disposed along a ray extending from the common axis 24 of exciter rotors 118,116, a permanent magnet 154 affixed to an end of the pole piece and having a face divided into first and second surfaces 154$a$,154$b$ by a groove 154$c$, a primary conductive coil 156 having lead wires 156$a$,156$b$, and a secondary or anti-cross talk conductive coil 158 having lead wires 158$a$,158$b$. Both coils surround the pole piece. The position of the coils relative to each other may vary. Permanent magnet surfaces 154$a$,154$b$ are positioned for close traversal by the exciter surfaces 134$a$ of exciter rotor 118. Dimensions of permanent magnet 154 relative to pole piece 152 and exciter rotor teeth 134 are shown in the enlarged views of FIGS. 8A,8B, therein t equals the width of exciter teeth surfaces 134$a$ in the circumferential direction, s equals the circumferential spacing between the exciter teeth surfaces 134$a$ or the teeth 134, $d_p$ equals the diameter of pole piece 152, $d_m$ equals the diameter or length of permanent magnet 154 in the circumferential direction, and h equals the height of the permanent magnet. The depth of slot 154$c$ preferably should not exceed 60% of the height h or the thickness of the magnet so as not to unduly weaken the magnet. Also, the depth of slot 154$c$ preferably is about one half the circumferential width of exciter surfaces 134$a$ to ensure good flux change as the exciter surfaces move from traversal of the surface 154$a$ to traversal of the slot. The length of permanent magnet surfaces 154$a$,154$b$ is substantially equal the length of exciter rotor teeth 134 in the direction of axis 24. Permanent magnet surfaces 154$a$,154$b$ are substantially mirror images of exciter surfaces 134$a$.

Figure 6:
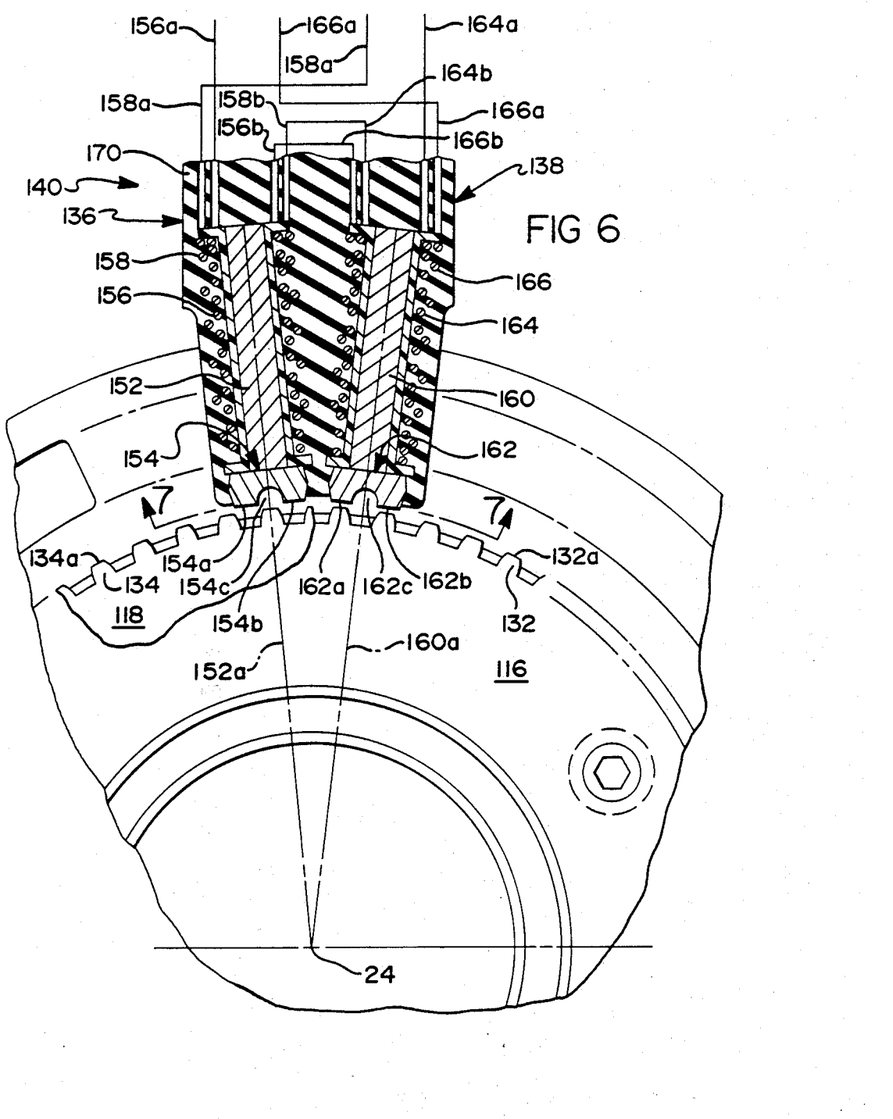
FIG. 6 is an enlarged staggered sectional view of a broken away portion of the dual speed sensor pick-up assembly looking in the direction of arrows 6—6 in FIG. 6 with primary coils therein coils schematically wired to secondary or cross talk coils.
Figure 7:
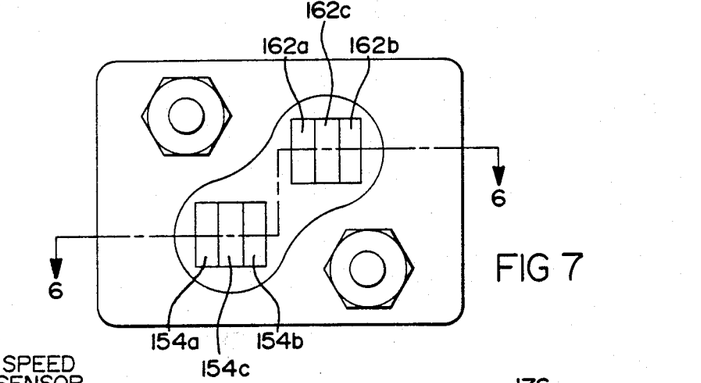
FIG. 7 is a relief view of the dual speed sensor pickup assembly looking in the direction of arrows 7—7 of FIG. 6.
Figure 8A:
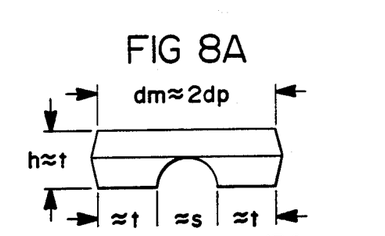
FIGS. 8A and 8B are enlarged views of a magnet in FIGS. 6 and 7.
Figure 8B:
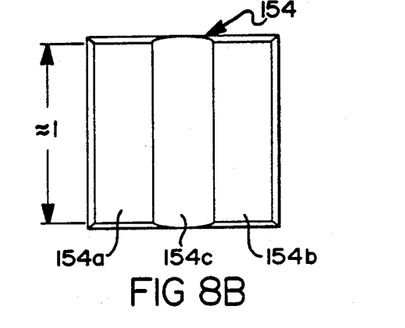
Figure 9A:
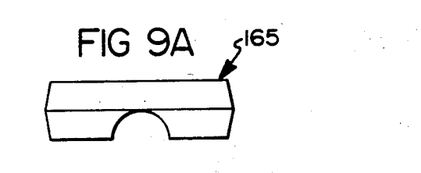
FIGS. 9A, 9B and 10A, 10B are alternative embodiments of permanent magnets in FIGS. 6 and 7.
Figure 9B:
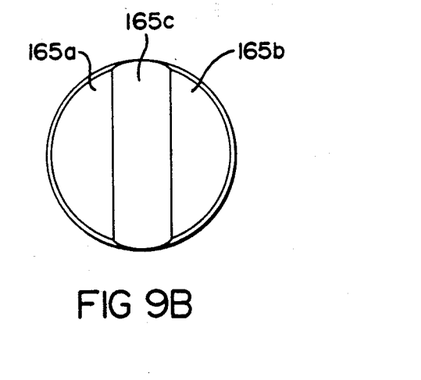
Figure 10A:
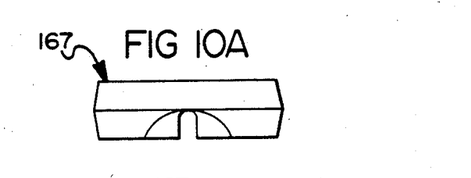
Figure 10B:
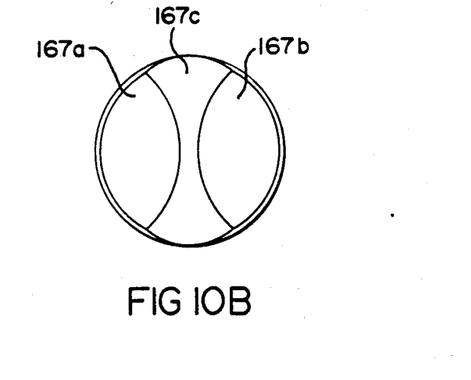

Speed sensor 138 is the same as speed sensor 136 and includes an elongated ferromagnetic pole piece 160 having a longitudinal axis 160$a$ disposed along a ray extending from common axis 24 and skewed relative to the axis of pole piece 152, a permanent magnet 162 having surfaces 162$a$,162$b$ and a groove 162$c$, a primary conductive coil 164 having lead wires 164$a$,164$b$ and a secondary or anti-cross talk conductive coil 166 having lead wires 166$a$,166$b$. Secondary coils 158,166 have substantially fewer wraps of wire than do primary coils 156,164. The exact number of wraps may be empirically determined for a given dual sensor assembly and for a given installation. Herein for example only, primary and secondary coils 156,158 and 164,166 are wound in opposite directions.

Alternatively, as shown in FIGS. 9A, 9B and 10A, 10B, round or puck shaped permanent magnets 165 or 167 may be used. Magnet 165 includes a circular face defining surfaces 165$a$,165$b$, corresponding to surfaces 136$a$,136$b$, and separated by a groove 165$a$ having parallel sides defining the trailing and leading edges of the surfaces 165$a$,165$b$ in the forward direction of exciter rotor rotation and leaving the remaining arcs of the circular face to define the leading and trailing edges of surfaces 165$a$,165$b$, respectively. Magnet 167 includes surfaces 167$a$,167$b$ having symmetrical or mirror image leading and trailing edges by providing the groove 167$c$ with arc shaped side of radius equal to the radius of the magnet face.

Figure 11:
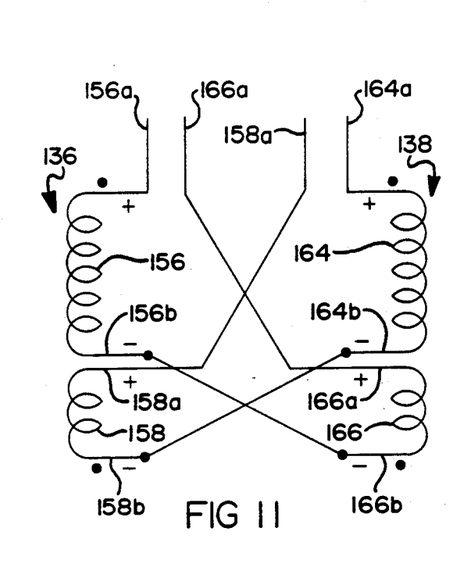
FIG. 11 is a schematic of the dual speed sensor pickup assembly primary and second coils and the wiring therebetween.
Figure 12:
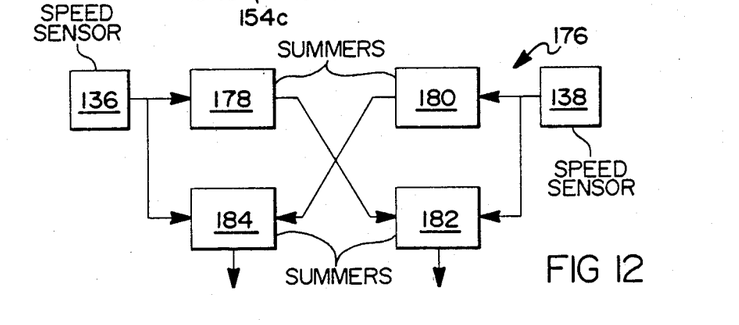
FIG. 12 is a schematically illustrated control system of negating or reducing cross talk in the output primary coils without need of secondary coils.

Due to the relative closeness of the primary coils, magnetic flux lines from each sensor induce unwanted signals into the primary coil of the other sensor. These unwanted signals, known as cross talk signals, are effectively cancelled by signals from the secondary coils. In the example of FIGS. 6 and 11, the primary coils 156,164 are respectively connected in series with the secondary coils 166,158 such that at any given time the instantaneous polarity of the cross talk signal in each primary coil is substantially opposite the instantaneous polarity of the anti-cross talk signal in the serially connected secondary coil. Specifically, primary coil lead wire 156$b$ is connected to secondary coil lead wire 166$b$ and primary coil lead wire 164$b$ is connected to secondary coil lead wire 158$b$. Accordingly, lead wires 156$a$,166$a$ are the output leads for sensor 136 and lead wires 158$a$,164$a$ are the output leads for sensor 138; these leads are connected to CPU 142 in known manner. In the schematic of FIG. 11, the dots indicate the coil starts, and the + and − signs adjacent the lead wires of the primary and secondary coils represent the instantaneous polarities at a given instant of the cross talk signals in the primary coils and the anti-cross talk signals in the secondary coils. The polarity of the cross talk signal in each primary coil is approximately 180 degrees out of phase with respect to the true speed signal in the adjacent primary coil and the anti-cross talk signal in the secondary coils 158,166 are in phase respectively with the true speed signals in the primary coils 156, 164. As previously mentioned, the amplitude of the cross talk and anti-cross talk signals are matched by varying the number of wire turns or wraps in the secondary coils.

The dual pickup assembly 140 includes a mounting plate 168 and a molded block of composite material 170, such as epoxy resin, in which the speed sensors 136,138 are retained. Measured in a direction parallel to axis 24, the axes of pole pieces 152,160 are separated by a axial distance 172 (see FIG. 5A) generally equal to the axial separation of exciter rotor teeth 132,134 of exciter rotors 116,118. However, since the pole pieces are circumferentially offset, the ends of pole pieces or magnets, when measured circumferentially (see FIG. 5B) are separated by a distance 174 which exceeds distance 172. By maximizing the separation of the pole pieces while still maintaining their axes radial to the common axis 24 of the exciter rotors, the accuracy of the speed sensor is maximized while the tendency of electromagnetic cross talk interference is minimized. This is particularly important in the event secondary coils are not used and the cross talk signals are removed by an electronic circuit 176 such as shown in FIG. 11.

Circuit 176 includes attenuating devices 178,180 and summing devices 182,184; such devices are per se well known in the prior art. Devices 178,180 are respectively cross connected at their outputs to one of the inputs of summing devices 182,184. The output of sensor 136 is connected to the input of device 178 and the other input of device 184. The output of sensor 138 is connected to devices 180,182 in a like manner. The output of each sensor is a composite signal of the true speed signal and the cross talk signal. The cross talk signal in each sensor output is a function of and a relatively low percentage of the composite signal of the adjacent sensor. Further, the phase angle of the cross talk signal is approximately 180 degrees out of phase with respect to the phase angle of the composite signal of the adjacent sensor. Accordingly, for example, an out of phase approximation of the cross talk signal in the composite signal of sensor 138 can be obtained by attenuating the composite signal function of sensor 136 to obtain an anti-cross talk signal which is added to the composite signal of sensor 138, thereby obtaining a signal at the output of summer 182 which is a close approximation of the true speed signal. A close approximation of the true speed signal for sensor 136 is obtained in the same manner. Circuit 176 may be contained in CPU 142, preferably the circuit is made integral with the dual speed sensor, thereby providing an universally adaptable dual speed sensor.

Specific details of the embodiments of the present invention have been disclosed herein for illustrative purposes only. The appended claims are intended to cover inventive features of the disclosed embodiments and modifications of inventive features believed to be within the spirit of the invention.

What is claimed is:

1. A dual speed sensor pickup assembly for sensing the rotational velocity of a first and a second exciter rotor, said exciter rotors closely axially spaced and independently rotatable about a common axis of rotation, said pickup assembly comprising mounting means for mounting said pickup assembly in predetermined position relative to said first and second exciter rotors, a first and a second closely spaced speed sensor assembly fixedly retained in said mounting means, each of said speed sensor assemblies comprising a ferromagnetic pole piece, a permanent magnet and a conductive coil surrounding the pole piece, said pole pieces each defining a longitudinally extending axis about which the coil is looped; said coils each having a composite signal induced therein composed of a true speed signal of the associated exciter rotor and a cross talk signal from the other speed sensor; said pickup assembly characterized by:

each speed sensor including anti-cross talk means associated therewith for producing an anti-cross talk signal added to the composite signal in the coil of the other speed sensor for canceling the cross talk signal therein.

2. The dual pickup assembly of claim 1, wherein the first mentioned coils are primary coils, and wherein the anti-cross talk means includes a secondary conductive coil surrounding the pole piece of each speed sensor and producing said anti-cross talk signal added to the primary coil of the other speed sensor.

3. The dual pickup assembly of claim 2, wherein the anti-cross talk coils have substantially fewer turns than the primary coils and the number of anti-cross talk coil turns is proportional to the amplitude of the cross talk signal in adjacent speed sensors.

4. The dual pickup assembly of claim 1, wherein the anti-cross talk means includes first and second devices for attenuating respectively the composite signals of the first and second speed sensors for producing said anti-cross talk signals, and first and second summing means for respectively receiving the composite signals of the first and second speed sensors and the anti-cross talk signals of the second and first devices.

5. The dual pickup assembly of claim 4, wherein the anti-cross talk means is mounted on the dual pickup assembly.

6. The dual pickup assembly of claim 1, wherein the pole pieces of each speed sensor has a longitudinal axis, said longitudinal axes each disposed along a ray extending from the common axis of the exciter rotors; and a permanent magnet affixed to an end of each pole piece and having a face positioned for close traversal by circumferentially spaced apart exciter surfaces defined by the associated exciter rotor, and each face having a slot therein dividing the face into first and second surfaces positioned for substantially simultaneous traversal by adjacent exciter surfaces of the associated exciter rotor.

7. The dual pickup assembly of claim 6, wherein the first mentioned coils are primary coils, and wherein the anti-cross talk means includes a secondary conductive coil surrounding the pole piece of each speed sensor and producing said anti-cross talk signal added to the primary coil of the other speed sensor.

8. The dual pickup assembly of claim 7, wherein the anti-cross talk coils have substantially fewer turns than the primary coils and the number of the anti-cross talk coil turns is proportional to the amplitude of the cross talk signal in adjacent speed sensors.

9. The dual pickup assembly of claim 6, wherein the anti-cross talk means includes first and second devices for attenuating respectively the composite signals of the first and second speed sensors for producing said anti-cross talk signals, and first and second summing means respectively receiving the composite signals of the first and second speed sensors and the anti-cross talk signals of the second and first devices.

10. The dual pickup assembly of claim 9, wherein the anti-cross talk means is mounted on the dual pickup assembly.

11. A dual speed sensor pickup assembly for sensing the rotational velocity of a first and a second exciter rotor, said exciter rotors, closely axially spaced and independently rotatably about a common axis of rotation, said pickup assembly comprising mounting means for mounting said pickup assembly in predetermined position relative to said first and second exciter rotors, a first and a second closely spaced speed sensor assembly fixedly retained in said mounting means, each of said speed sensor assemblies comprising a ferromagnetic pole piece, a permanent magnet and a conductive coil surrounding the pole piece, said pole pieces each defining a longitudinally extending axis about which the coil is looped; said coils each having a composite signal induced therein composed of a true speed signal of the associated exciter rotor and a cross talk signal from the other speed sensor; said pickup assembly characterized by:

a secondary conductive coil surrounding the pole piece of each speed sensor for producing an anti-cross talk signal, the secondary coil surrounding the pole piece of each speed sensor connected in series with the primary coil of the other sensor such that at any given time the instantaneous polarity of the cross talk signal in each primary coil is substantially opposite the instantaneous polarity of the anti-cross talk signal in the serially connected secondary coil.

* * * * *